(12) United States Patent
Dulin et al.

(10) Patent No.: US 6,922,622 B2
(45) Date of Patent: Jul. 26, 2005

(54) HOT VEHICLE SAFETY SYSTEM AND METHODS OF PREVENTING PASSENGER ENTRAPMENT AND HEAT SUFFOCATION

(75) Inventors: Jacques M. Dulin, Sequim, WA (US); Ralf Seip, Indianapolis, IN (US)

(73) Assignee: Robert Bosch Corporation, Broadview, IL (US)

( * ) Notice: Subject to any disclaimer, the term of this patent is extended or adjusted under 35 U.S.C. 154(b) by 184 days.

(21) Appl. No.: 09/845,016

(22) Filed: Apr. 27, 2001

(65) Prior Publication Data

US 2002/0161501 A1 Oct. 31, 2002

Related U.S. Application Data

(63) Continuation-in-part of application No. 09/325,242, filed on Jun. 3, 1999, now Pat. No. 6,314,380.

(51) Int. Cl.[7] .......................... B60R 22/00; G06F 17/00
(52) U.S. Cl. .......................... 701/45; 701/49; 340/438; 340/449; 180/272; 180/287; 280/735
(58) Field of Search .......................... 236/44 R, 44 C, 236/49.3, 91 F; 237/2 R, 5, 12.3 R, 12.4, 28; 340/500, 506, 426.23, 438, 449, 501, 575.3, 425.5, 459, 460, 468, 474; 180/287, 268, 271, 272, 273, 289; 280/734, 735, 730.1, 730.2, 738, 801.1, 802; 307/9.1, 10.1; 701/451, 1, 36, 49

(56) References Cited

U.S. PATENT DOCUMENTS

| | | | | |
|---|---|---|---|---|
| 4,851,822 A | * | 7/1989 | Barnett ........................ 340/585 |
| 4,963,856 A | | 10/1990 | Yukitomo .................... 340/426 |
| 5,071,160 A | * | 12/1991 | White et al. ................. 280/735 |
| 5,222,661 A | * | 6/1993 | Wenhart ..................... 236/49.3 |
| 5,311,746 A | * | 5/1994 | Dombrowski et al. .... 236/DIG. 19 |
| 5,482,314 A | * | 1/1996 | Corrado et al. ............. 280/735 |
| 5,793,284 A | * | 8/1998 | Teague ........................ 340/438 |
| 5,860,674 A | * | 1/1999 | Corrado ...................... 280/735 |
| 6,028,509 A | * | 2/2000 | Rice ......................... 340/425.5 |
| 6,263,272 B1 | * | 7/2001 | Liu et al. ................... 236/44 C |
| 6,314,380 B1 | * | 11/2001 | Seip et al. .................... 702/99 |
| 6,431,592 B2 | * | 8/2002 | Seip ............................ 280/735 |

* cited by examiner

*Primary Examiner*—Jacques H. Louis-Jacques
(74) *Attorney, Agent, or Firm*—Innovation Law Group, Ltd; Jacques M. Dulin (57) ABSTRACT

Safety systems for vehicles, primarily passenger vehicles, comprising automated systems and methods for preventing entrapment of children, disabled, aged or infirm persons, or pets from being trapped in closed vehicles left in the sun, so that they will not suffocate from the heat. The invention is characterized by use of one or more systems to sense the occupancy state and temperature inside the vehicle passenger or load space, and provide one or more outputs which can selectively be employed to provide interior and exterior warning of a trapped passenger in a dangerously hot car to permit rescue, and/or to activate vehicle electro-mechanical systems to relieve the heat, such as rolling down windows, unlatching seat belts, unlocking doors, starting the car and/or fans or air conditioning systems and the like. The exterior warnings may be any suitable warning, such as sounding the car horn or alarm siren, flashing head, tail or special lights, placing an emergency call via a vehicle dedicated cell phone, CB radio, GPS system, or the like.

36 Claims, 2 Drawing Sheets

HOT VEHICLE SAFETY SYSTEM AND METHODS OF PREVENTING PASSENGER ENTRAPMENT AND HEAT SUFFOCATION

CROSS-REFERENCE TO RELATED CASE

This Application is a Continuation-In-Part of U.S. Pat. No. 09/325,242 filed Jun. 3, 1999 by Ralf Seip Russell C. Watts, entitled Ultrasound Transducer Temperature Compensation Methods, Apparatus and Programs, now U.S. Pat. No. 6,314,380 Issued Nov. 2, 2001, the benefit of the date of the filing which is hereby claimed under 35 USC 120.

SPECIFICATION

1. Field

The invention relates to safety systems for vehicles, primarily passenger vehicles, and more particularly to automated systems and methods for preventing entrapment of children, disabled, disoriented, aged or infirm persons, or pets from being trapped in closed vehicles left in the sun, so that they will not suffocate from the heat. The invention is characterized by use of one or more systems to sense the occupancy state and temperature inside the vehicle, and provide one or more outputs which can selectively be employed to provide interior and exterior warning of a trapped passenger in a dangerously hot car to permit rescue, and/or to activate vehicle electro-mechanical systems to relieve the heat, such as rolling down windows, unlatching seat belts, unlocking doors, starting the car and/or fans or air conditioning systems and the like. The exterior warnings may be any suitable warning, such as sounding the car horn or alarm siren, flashing head, tail or special lights, placing an emergency call via a vehicle dedicated cell phone, CB radio, GPS system, or the like.

2. Background

As reported by the national SAFE KIDS Campaign, on the order of 30 children die in the United States each summer from hyperthermia as a result of being left in locked vehicles with the windows closed. SAFE KIDS reports "When the outside temperature is 93° F., even with a window cracked the temperature inside a car can reach 125° F. in just 20 minutes, and approximately 140° F. in just 40 minutes. In these extreme conditions, children can die or suffer permanent disability quickly—in a matter of minutes." Dr. Martin Eichelberger, MD, director of Trauma Surgery at Children's National Medical Center and President of the National SAFE KIDS Campaign states: "Extreme heat affects infants and small children disproportionately . . . Heat rapidly overwhelms the body's ability to regulate temperature. In a closed environment, the body can go into shock and circulation to vital organs will begin to fail."

In many occurrences, the children are strapped into infant seats, are secured by seat belts and/or are told by the driver to remain in the car. Still others are children who enter unlocked cars as part of play. They may lock themselves in, are too young or lack the developmental capability to reopen the car doors. Or they become disoriented and weak from the rapidly rising heat. In short, any unlocked car can become a deadly playground for small children.

This situation can also occur in the case of an accident, such as where the driver is knocked unconscious, is incapacitated or dead, or is thrown from the vehicle. Those situations arise in remote areas or bad weather accidents, such as in mountain driving where the vehicle runs off the road and may roll over or fall into a canyon where it is hidden from view of passers-by.

The problem of entrapment and heat death is not confined to the young, but also occurs with older, handicapped, disoriented or infirm people who are being transported by others. The driver may leave the vehicle unattended for a period of time longer than expected, and the temperature rise in the vehicle may be so rapid that the handicapped or older person is effectively trapped in the vehicle and succumbs to hyperthermia or heat induced suffocation. Likewise, many pets or other animals left in locked vehicles die from hyperthermia.

Vehicles exposed to full sun in the summer experience extremely rapid rises of interior temperature. While there is some difference between a light colored vehicle and a dark colored vehicle, the difference is relatively insignificant from the point of view of the onset of hyperthermia. Interior temperatures of a closed vehicle can easily reach approximately 200–250° F. Heat prostration and/or disorientation or incapacitation can occur within a few minutes under such conditions, and it is estimated that suffocation follows within ½ hr to an hour. Indeed, there are reports of heat death occurring where a child was left in a car seat for more than two hours although the outside temperature was only 63° F. The National SAFE KIDS Campaign warns parent to be especially vigilant about their children's safety on days when temperatures are 80° F. or higher.

At present, there is no known safety system to selectively permit cooler outside air to circulate within the car, nor a system to automatically alert passers-by or dial up emergency personnel when this class of passengers are trapped in the car. Even if passers-by were to become aware of the problem, in many instances the vehicle doors are locked, and by the time safety officers or paramedics can arrive, it is too late. While the child or older adult in the vehicle, if not strapped into a seat, could conceivably reach and honk the car horn, that alert may not bring immediate rescue. Nor is that solution available to young children or pets who do not know the location and function of the auto horn, likewise that solution is not available to senile, feeble, infirm or disoriented adults.

Accordingly, there is a need for an automatic safety system to release a person trapped in an overheating closed vehicle and/or assist them in reducing the temperature in the vehicle to prevent the onset of hyperthermia and heat induced suffocation.

THE INVENTION

The invention comprises safety systems for vehicles, primarily passenger vehicles, and more particularly to automated systems and methods for preventing entrapment of children, disabled, disoriented, aged or infirm persons, or pets from being trapped in closed vehicles left in the sun, so that they will not suffocate from the heat. The invention is characterized in the present preferred embodiment by use of automotive occupancy sensor systems to sense the occupancy state and temperature inside the vehicle, and to provide one or more outputs which can be selectively employed to trigger or provide interior and/or exterior warning of a trapped passenger in a dangerously hot car to permit rescue. The output(s) can also activate electro-mechanical systems to relieve the heat, such as rolling down windows, unlatching seat belts, unlocking doors, starting the car and/or fan or air conditioning systems, and the like.

The interior alerts can be any suitable warning system, such as sounding a buzzer, a flashing light on the dash, a flashing message panel, a voice annunciator or the like. The exterior warnings may be any suitable warning, such as sounding the car horn or alarm siren, flashing head, tail or special lights, placing an emergency call via a vehicle-dedicated cell phone, CB radio, GPS system, or the like.

In a first embodiment, the inventive safety system comprises an automotive occupancy sensor (AOS) system, preferably one having a thermistor or other suitable temperature sensor or sensing capability, electronically linked to one or more internal or/and external alarm or condition alarms, and to electro-mechanical systems of the vehicle to permit release of the passenger(s), or/and permit cooler air to enter the vehicle.

The alarms are selected from interior passenger warning alarms, such as dashboard warning lights, interior buzzers, synthesized or recorded voice-annunciators or the like, and from exterior alarms, such as flashing of headlights, tail lights or special warning lights on the vehicle, beeping of horns or sounding of auto theft or intrusion sirens or alarm horns, and for call out of synthesized voice messages on cell phones, GPS systems, CB radios, or the like. The electro-mechanical systems for release of the trapped passenger(s) include: unlatching of seat belts; turn on of the vehicle motor and/or fan-powered exterior air vents or air conditioner (if any and if operative); use of battery power to power the fans or air conditioner independent of motor turn-on; unlocking of the vehicle doors; rolling down of the windows or partial or full retraction of soft tops or sun roofs; automatic opening of one or more passenger side doors in the case of powered opening doors; unstowing of wheelchair lifts or ramps in the case of handicap vans, buses, transit vehicles; and the like.

The term "vehicle" as used herein includes automotive vehicles of all types, including by way of example and not by way of limitation: passenger cars, SUVs, trucks, buses, vans, transit vehicles, airplanes, and military vehicles of all types.

The system of the invention activates when it senses:
a) the temperature is above a pre-set minimum, say 90–95° F.;
b) the vehicle is stopped; and, optionally, but preferably,
c) the presence of an occupant.

When those conditions are sensed, the safety system of the invention selectively actuates the release and alarm functions noted above. As an example, the system activates the power windows to roll down, permitting release of hot air and entry of relatively cool air to cool off the vehicle interior. Alternately, or in addition, and preferably, the inventive safety system can: a) honk the car horn rapidly to attract the attention of rescuers; b) trigger power door locks to open; and c) where the occupant is buckled into a safety belt, it can trigger a belt latch release (e.g., a solenoid) to release the buckle and thus permit the occupant to exit the vehicle under his or her own power, or to be removed by a rescuer. In still another embodiment of the invention, the inventive system can include a cell-type phone to dial 911 or selected person(s), or CB radio programmed to dial up or transmit on emergency frequencies, a closed/hot car emergency message.

The AOS preferred is that of the type illustrated in the Corrado et al. U.S. Pat. No: 5,482,314, issued Jan. 9, 1996; U.S. Pat. No. 5,890,085 issued Mar. 30, 1999; U.S. Pat. No. 5,860,674 issued Jan. U.S. Pat. No. 19, 1999; and U.S. Pat. No. 5,873,597, issued Feb. 23, 1999. These AOS systems are of the type having at least one ultrasound sensor, and are employed to determine the presence of an occupant. Other types of occupancy sensing systems may be employed, including optical (visual) recognition systems, seat or capacitance sensors, H-Zone sensors (such as disclosed in co-pending U.S. Ser. No. 09/292,170, filed Apr. 15, 1999, the disclosure of which is hereby incorporated by reference); audio (sound and voice recognition system) sensors; and the like.

The safety system of the present invention in a first embodiment also determines if the vehicle is stopped. This condition can be determined in any convenient way, e.g.: input from the vehicle accelerometer (typically in the airbag control module) and/or GPS location updates; monitoring odometer activity, vehicle electrical system activity, engine activity, braking; or external motion sensing (e.g., near object detection by radar or ultrasound). By way of example, the vehicle at rest (stopped) condition and interior temperature can be extracted by the AOS from the ultrasound return, as described in more detail below. Monitoring ignition interior switch state (On vs. Off) or history is also a simple way to determine if the stopped-vehicle condition is met.

When the stopped vehicle condition is met, after a pre-set delay period, say 5–10 minutes, the occupancy sensor system is polled or the occupancy history database is checked to determine if an occupant is present. For example, in the AOS system, the ultrasound sensor is activated by a timer to "scan" for occupant presence in a slow ping mode. If occupant presence is detected, the temperature is monitored, and at preselected trigger temperature, the alerts and alarms are triggered. There can be several levels of alerts and alarms. For example, where temperature reaches a preselected minimum, say from about 80° F. to 90° F., the interior voice alerts is activated, followed by buzzer alert at reaching a second preselected value, say from about 82° F. to 92° F. within, say from about 1–5 minutes. Thus, the voice alert is triggered at 80° F.–90° F.: "Warning, interior temperature is too high, Open Window". This can be repeated every 15 seconds, and at 82° F.–92° F., the buzzer can come on, accompanied by voice "Urgent, lower window now". If the safety system senses that the window motor has been activated to open after the 90° F. warning, it can switch to a temperature monitoring branch in the control logic, dispensing with further audio warnings.

The invention also includes in an alternative embodiment automatic initiation of one or more of the internal and/or external alert/warning systems when the exterior temperature exceeds a predetermined temperature, say in the range of from about 60° F. to about 80° F. Many vehicles have external temperature sensors. When the external temperature is sensed at or above the external temperature threshold, the internal warning system is initialized, so that upon stopping of the vehicle, upon opening of a door by the driver and/or other able passenger, a warning to not leave non-abled persons (as defined below) unattended in the vehicle is activated. In the absence of an external temperature sensor, a driver or able passenger-activatable switch may be provided on the dashboard, or at any other convenient place within easy reach of the driver and attending passenger. In this latter embodiment, when the driver/able passenger enters the vehicle, the switch is turned on by one of them (or automatically upon the door driver door being opened) so that upon exit, the alert/warning will remind the driver/passenger to not leave a child or other non-abled person in the vehicle.

In another embodiment, the alert system can be triggered to the operational "ready" state upon opening of any door, even when the vehicle is not running, to guard against "crawl-in" entrapment of children playing. In this embodiment, the system can evaluate inputs of external as well as internal temperature. One skilled in the art will appreciate and accommodate a wide number of scenarios for inclusion in the alert algorithm. For example, for the following sensed conditions and activity sequences: vehicle stopped; external temperature 80° F.; trigger "ON" when any door, trunk lid, or load compartment door sequence of: open/close occurs; sense interior temperature; optionally sense occupancy; when interior temperature reaches or exceeds preset value, say 90° F.; or after a preset time, say 5 minutes, and, optionally, occupancy presence is positive; trigger interior alert; monitor response; where negative response, follow with exterior alert/warning sequence.

As an alternative to using a thermistor, thermocouple, thermostat or other temperature sensor for temperature determination, the interior temperature of the vehicle can be monitored with the ultrasound sensor, e.g. as set forth in Ultrasound Transducer Temperature Compensation Method, Apparatus and Program case 24347-0041, U.S. Ser. No. 09/325,242, filed Jun. 3, 1999, now U.S. Pat. No. 6,314,380 B1, issued Nov. 6, 2001, the disclosure of which is hereby incorporated by reference. Where, for example, the vehicle is stopped at night and the temperature gradually declines over a period of time, the slow ping mode can be further reduced to an intermittent ping, sleep mode, or switched to Off. This would continue until the temperature begins to rise to, or near a pre-set temperature threshold, at which temperature level, two things happen: First, the ping rate increases (if necessary for full discrimination), and second, the return signal is analyzed for presence of an occupant.

As an option, if the temperature is below the threshold value, the US return signal can be analyzed for presence of an occupant, and if no occupant is sensed to a high degree of accuracy, then the AOS system is preprogrammed to switch into a semi-permanent "sleep" mode until some other activity occurs, such as a door being opened or the vehicle started. Where doors open without the vehicle being started, a door open sensor (such as a simple contact switch) can signal the AOS to "wake up". Of course, where the vehicle is started, then the AOS goes into its normal operational mode as set forth in the above identified patents and applications.

Continuing with the situation where the temperature rises to the threshold and the occupancy sensor signal is analyzed for presence of an occupant, the ping rate increases and the occupant activity or presence is monitored. Where the occupant remains in the vehicle for a pre-determined time, say 5–20 minutes, the temperature continues to rise, and any interior warnings are ignored or inappropriately responded to; at that point the safety system of the invention triggers one or more of the safety events described above: typically causing selected windows to roll down all or part way and/or external alarms to be sent or sounded. If movement in a fixed location is sensed by the AOS, such as in the example of an infant buckled into a child seat, the AOS may trigger the vehicle horn to sound a rapid series of honks to attract attention for rescue of the child. An important alternative is for the inventive system to unlock selected door(s), or both unlock door(s) and honk the horn. However, because the AOS cannot determine the specific location of a vehicle, say next to a busy street, the unlocking of doors is not a preferred solution, particularly doors on the driver's side. Further, for the same reason, only the windows on the passenger side may be selectively triggered to descend fully, or part way, and the doors only on the passenger side unlocked. For example, the windows on the driver's side of the vehicle could be triggered to descend only 1–4 inches, while the windows on the passenger's side could be triggered halfway or more down in order to provide for cross ventilation.

In some embodiments of the AOS, the temperature is sensed by a thermistor or thermostat unit separate from the ultrasound. Where the condition of a stopped vehicle is met, it is the temperature signal that signals the ultrasound into an occupant presence search mode with the safety responses as outlined above.

In other automotive occupancy sensors, the return signal from the ultrasound itself can be analyzed for the temperature in the vehicle interior as well as the presence and/or location of an occupant, as set forth in Ser. No. 09/325,242, filed Jun. 3, 1999, now U.S. Pat. No. 6,314,380 B1, issued Nov. 6, 2001.

The ultrasound return signal is analyzed by the appropriate signal processing algorithm as prescribed in the above-identified patents to determine the nature and location of an occupant. The AOS ultrasound returns are conventionally well capable of distinguishing between an inanimate object and a living occupant. Note, the safety system of the invention is also applicable to rescuing pets left locked in closed vehicles which are no less susceptible to hyperthermia.

During ordinary vehicle operation, as when the vehicle is moving, the ultrasound sensor has a power requirement on the order of 500 miliwatts. The return signals from the ultrasound pings include a substantial amount of extraneous noise from road irregularities causing interior surfaces of the vehicle to be in vibratory motion. The AOS circuitry and algorithms ordinarily include hardware and/or software filters to clean up the signals and compensate for the road vibrations. This ordinarily requires ultrasound sensors to be driven at relatively high power, the aforementioned 500 miliwatts. However, in the safety vehicle system of the present invention, since the road vibrations are not present when the vehicle is not moving, the ultrasound sensors can run slower or at lower power, conserving battery power. The battery can further be conserved by programming the AOS progressively or sequentially into slow-speed mode, intermittent mode, or sleep mode.

Further, because of the road-induced vibrations it is possible for the AOS ultrasound sensor to discriminate between a stopped/parked vehicle by analyzing for the characteristics of road-induced vibrations in the return signals. The AOS can detect when the signal level of the characteristic road-induced vibrations drop below a predetermined threshold, thus providing a preferred method to determine when the vehicle is stopped and/or parked with the motor off. Accordingly, in this embodiment, the accelerometer need not be connected to the AOS.

Thus, analysis of the ultrasound return signal provides all the information necessary to determine when the AOS switches into the safety mode of this invention. By "safety mode of this invention" is meant the mode of comparison of the vehicle interior temperature to presence and motion of an occupant, monitoring for a rise to unsafe temperatures and then triggering one of the actions above described, lowering one or more windows partly or fully, or collectively unlocking one or more doors, honking the horn, releasing seat belts, dialing out 911, and the like. Alternatively, the car lights can be flashed or, where electrically opaqueing or reflecting glass is installed in the vehicle the appropriate charge or power can be applied to increase the window opacity or reflectivity to reduce interior temperature. The scope of the invention includes the AOS outputting in the safety system mode a signal which may then be used to trigger any other safety device activity or system presently known or hereafter developed.

In the above-identified U.S. Pat. No. 5,873,597, the AOS sensors are located in a console mounted in the headliner just above the front windshield. However, in presently pending Ser. No. 09/292,170, filed Apr. 15, 1999) a linear transducer assembly is disclosed in which an array of low cost US transducers may be used. This array can extend not only to "view" the driver and passenger seat, but also the rear seating area. In that invention, the ultrasound return signal is chopped off so that the ultrasound is "looking at" an object present only in the "H-Zone" ("Head Zone"), defined as a zone from shoulder height and above. This height-defined zone sensing is accomplished by "cut off" of the tail end of return echo signals. A linear or other array of transducers such as shown in that application may be used in conjunction with the safety system of this invention, but in this case, all of the signal is used (none is discarded) so that the ultrasound sensor is looking below the H-zone onto the seat and floor of the vehicle to detect the presence of an occupant, say a small child, or pet, which is thrashing in a car seat or moving, perhaps feebly, on the car floor.

In another embodiment, a capacitance or other type of pressure-type weight sensor is disposed in a child seat (or any passenger seat). Alternately, the capacitance sensor could be placed in the safety belt in a position that would be in close proximity to the body, say at the waist or chest area. This sensor is electrically connected to a warning element, such as a buzzer, a light, a voice synthesized message or a display message (such as an LCD or backlit strip display), which may be conveniently placed on the dashboard. It is also linked to a door sensor and an ignition sensor.

This system works as follows: When a child is buckled in a child seat, or an adult is buckled into a passenger seat, the system is armed. When the ignition is turned off and the driver side door is opened, the alarm goes off warning the driver not to forget the child in the infant seat in the back.

The capacitance weight sensor can be used in place of the ultrasound to sense presence of a passenger left abandoned in the vehicle after the driver leaves. The window position sensors advise the hot car safety system of this invention that the windows are closed, and the thermistor is triggered to monitor the temperature. When the conditions are met, that is, a) the capacitance or weight sensor has a positive indication of presence of a passenger, say a child in a forward-facing infant seat (FFIS) in the back seat; b) the temperature rises above the threshold; and c) the car is stopped; then the features of the inventive system are triggered, including one or more of: rolling selected windows partly or fully down, unlocking selected doors, honking the horn, cell phone/CB radio calling out, synthesized or pre-recorded voice announcements to passers-by from a vehicle mounted speaker, and the like.

The ultrasound sensor transmit and echo signals can also be used to determine the window position where the ultrasound is side scanning, that is, is pointed somewhat towards the passenger doors. Alternately, a proximity or contact window position sensor may be employed. Where the windows are partially opened, the inventive system can roll the windows down further, or could honk the horn, blink the lights, unlock a passenger door or the like. Thus, the invention comprises use of any one or more of the combinations described in this specification.

BRIEF DESCRIPTION OF THE DRAWINGS

The invention is illustrated by reference to the drawings, in which.

DETAILED DESCRIPTION, INCLUDING THE PRESENT BEST MODES OF CARRYING OUT THE INVENTIONS

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
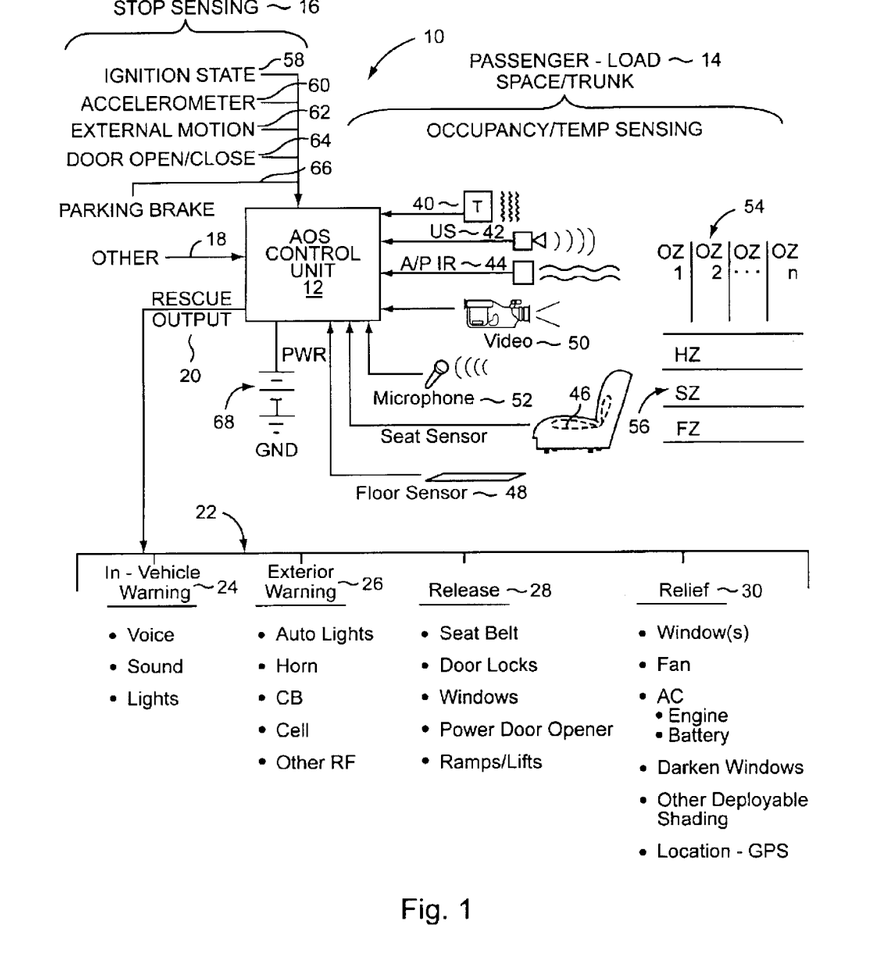
FIG. 1 is a schematic illustration of the system apparatus identifying both Occupancy and Stop condition sensor inputs and the menu of Rescue outputs for a vehicle.
Figure 2:
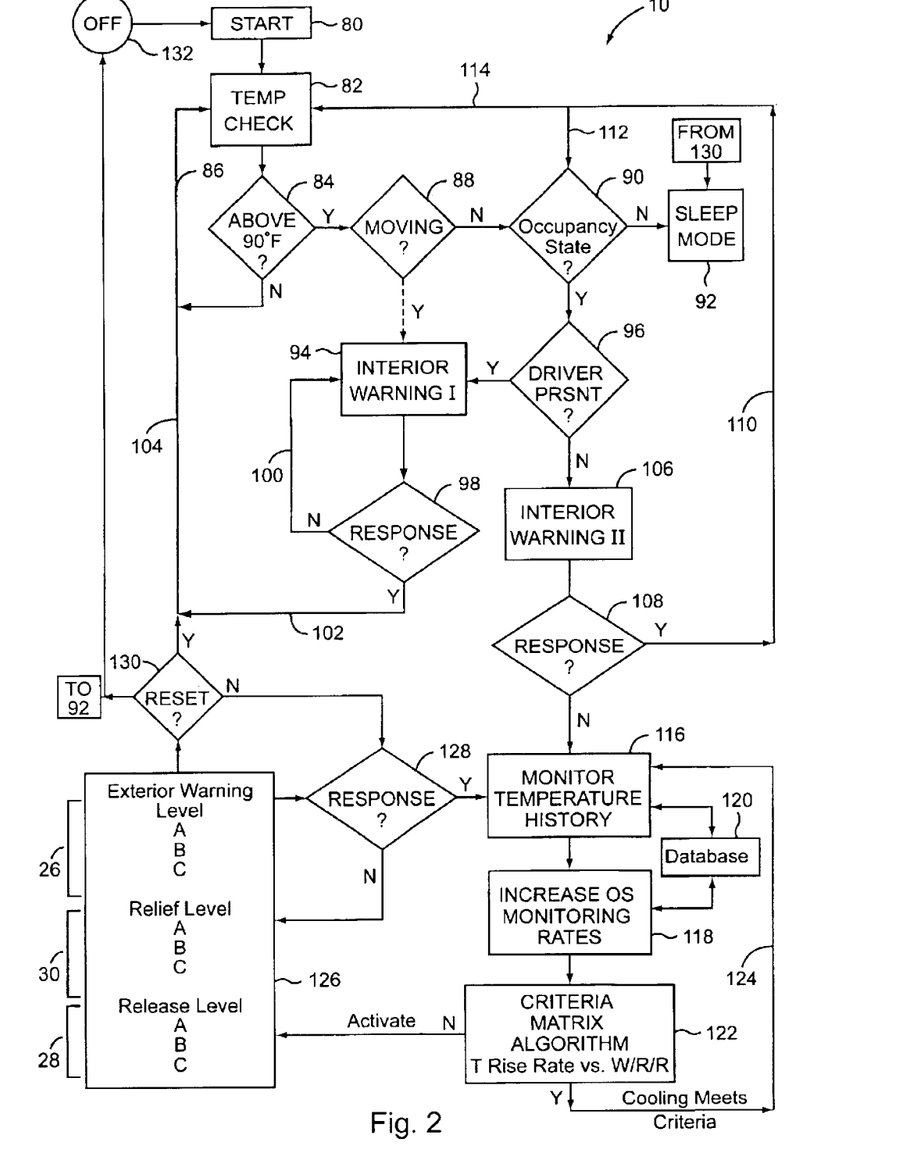
FIG. 2 is a flowchart illustrating system monitoring, decision algorithm, and Warning, Relief and Release logic points for an exemplary safety system of the invention.

Referring to the figures, exemplary embodiments of the invention are shown in system apparatus aspects in FIG. 1 and in method aspects in FIG. 2. In FIG. 1, the inventive system 10 comprises a control unit 12, shown by way of example as an automotive Occupancy Sensor unit which receives a plurality of sensor inputs, both from the passenger space or/and the trunk or other storage or product transport space, together identified as 14, and vehicle "stopped" condition sensing, 16. The control unit 12 may also receive other sensor, passenger/driver, or external inputs 18 as from time to time are determined or preselected to be useful inputs for the functioning of the control unit as described in more detail below. A non-limiting example of such "other" inputs include: exterior temperature (ambient temperature of the vehicle's environment); seatbelt latch switch closed sensor; or an inbound polling signal, e.g., remotely sensing the vehicle interior, be it acoustic or visual, to assist in determining the state of occupancy of the vehicle, its condition, or its state of operation or location. The control unit also outputs one or more signals 20 that trigger one or more of a menu of actions, 22, which typically are signals to activate one or more of the vehicle subsystems to assist in the warning of occupants 24, external warnings/alerts 26, release of the occupants 28, or to provide some measure of relief 30 from the overheated vehicle compartment in which the occupants are located.

A principle input is from one or more temperature sensors 40, for example a thermistor, thermocouple, thermostat, or other conventional temperature sensing device located in the passenger/load compartments where occupants may be located. A variety of occupancy sensors are employed, typically and preferably in combination in order to increase the probability of correct occupancy state determination, i.e., the correct determination of the nature and location of an occupant in the vehicle. Although reference will be made herein by way of example to the passenger compartment, it should be understood that the same or similar considerations can apply to the load compartment(s) evaluation for occupants. It should also be understood that different seat locations in the passenger compartment may be considered separately, and can be selectively treated differently. That is, the driver's seat can be evaluated differently than a passenger seat. Further, all seats can be looked at during travel, from the "beginning" moment one or more doors are opened, to ultimate stoppage and the "ending" open/close of the corresponding doors. This data is kept in a state history database of the AOS control unit 12, and can be referenced and compared for passenger location and count anomalies, assisting in the occupancy state and location. In this regard, the other input 18 can be a keypad or other device by which the driver inputs the number, age, seat location, and any other relevant data about the passengers, e.g., child in an infant seat, wheelchair occupant, infirm or handicapped person, or person developmentally immature or lacking in developmental capability, and the like (all of which are included in the term "non-abled" persons herein).

Accordingly, the suite of occupancy sensors include, by way of example, one or more ultrasound sensors, US 42 for motion detection, one or more active or passive InfraRed sensors 44, one or more sensors in each seat, such as a seat cushion and/or seat back capacitance, mass/weight, or pressure sensor 46, and one or more floor sensors, such as pressure, mass/weight, or capacitance sensor 48. Other, less presently preferred sensors can include video or other shape sensors 50, and audio sensors such as microphone 52. Preferably, one or more of these types of sensors are zoned, that is directed to preselected zones of the passenger compartments, such as fore/aft seat area Occupancy Zones, OZ 1, OZ 2, . . . , OZ n, 54, or vertical Occupancy Zones, Head Zone (HZ), Seat Zone (SZ), and Floor Zone (FZ), 56. A combination of the fore/aft and vertical zoning can be employed for suitable coverage.

In addition, the control unit 12 receives one or more inputs relating to the state of motion of the vehicle, called "Stop Sensing", 16. Typical inputs include an ignition state signal 58 (ignition, or ignition switch "ON"), and a vehicle in motion signal 60, e.g., from the speedometer or accelerometer (which typically is in the Airbag Control Unit). Optional auxiliary signals can be obtained from external motion sensors 62, such as near collision radar systems that track local area (1 m to 50 m distant) traffic, and/or door open/close condition sensor(s) 64, e.g., door handle actuation sensors, or door lock or lock circuit monitoring signals, and/or a parking brake condition sensor 66.

Indeed, the principles of this invention can be utilized to provide an announcement or warning to the driver if any door opens during travel, alerting the driver to an unsafe condition and potential danger to a passenger. Of course, each door can be monitored, tracked and reported separately. As used herein, by internal or in-vehicle announcing is meant a recorded or synthesized voice announcement, and by warning is meant a buzzer and/or warning light visible to the driver and selected other passengers if desired, preferably flashing.

The control unit is also powered by the vehicle power system 68, which when the vehicle is parked and "OFF", will usually be the battery or other auxiliary power, such as a dedicated auxiliary battery, fuel cell, external power cord, or the like.

The control unit employs an occupancy state algorithm to determine the nature and location of the occupant(s) of the vehicle. In the discussion that follows, it will be assumed that there is at least one passenger, and it is this passenger or these passengers who are being monitored. It is preferred that the AOS control unit employs a history database, which can assist by comparison to presently sensed signals to determine if there has been any change in the previously known state. The latter can include the Empty State condition (also known as the MT state or condition), which may be used as a starting point. The algorithm preferably can discriminate between a Forward Facing Infant Seat (FFIS) and a Rear Facing Infant Seat (RFIS), and whether these seats are occupied. Further, discrimination and identification by the AOS of Out Of Position (OOP) occupants is preferred. These, and other relevant states are determined by the AOS identification and discrimination algorithm based on the inputs from the various sensors in the passenger space and/or load space (trunk or product stowage space).

The temperature input and stop condition are also inputs to the control unit 12. Based on a safety algorithm, the controller 12 selectively, and optionally but preferably in phases during an extended period of monitoring, outputs one or more safety signals 20. The menu of actions initiated by the output signal 20 includes four basic classes:

Interior Alerts or Warnings, 24;
Exterior Warnings, 26;
Release of Passengers, 28; and
Heat Relief, 30.

The interior alerts or warnings include one or more synthesized or prerecorded voice announcements, such as "Warning, Interior Temperature Dangerously High, Open Window". If there is no responsive action by a passenger, further increase in temperature can trigger a buzzer and/or flashing warning light, which may be used independently, or in conjunction with the voice announcement warning. The light can be a back-lit message "High Interior Temperature Warning", or other suitable message.

It should be understood that a variety of hierarchies of safety activities can be designed and selected. Thus, for example, relief actions 30 can be programmed into the controller 12 if there is no response, or an inadequate response, to the warnings 24. Or the warnings can be skipped entirely, as for example where passengers are babies, or persons who otherwise would not understand or who could not take appropriate action. In an important alternative, the driver can input a weighting factor to the evaluation and decision algorithm matrix of the controller 12, or can turn off selected outputs, such as interior warnings by a switch on the dash or other appropriate input, such as a dash-mounted keyboard, personal digital assistant, or the like.

Thus, depending on temperature and temperature rise rate, the controller can activate one or more relief activities 30, such as progressively rolling down one or more windows, starting the outside air intake fan; turning on the air conditioning unit; darkening windows where electro-active windshields or windows are employed, and deploying other shading devices, such as retractable/unfurlable screening or reflective elements. In the case of electro-active windows, the windows could be controlled to change to a silver or white color, rather than darken, to increase solar reflectivity. In addition to the GPS locator can become active, sending out a distress signal to assist rescuers to locate the vehicle. The windows can be selectively rolled down, first the passenger side window closest to the passenger, and then other windows if conditions continue to worsen.

Likewise, as monitoring continues and interior conditions worsen, the exterior warnings 26 and release actions 28 can be selectively and progressively activated. These include flashing the vehicle lights, e.g. in a predetermined on-off pattern that is standardized world wide to mean "heat-distressed occupant needs help". Likewise, the horn can be sounded, in special beeping patterns having the same meaning, or in Morse code or other code. An on-board dedicated emergency cell phone or CB radio can be activated to transmit synthesized or prerecorded messages, or coded messages, including GPS locator coordinates. Any other suitable RF signal can be transmitted. With the connection established, remote rescue personnel can listen for occupancy activity and carry on 2-way conversations at a preselected point in the criteria matrix.

The following additional actions can be programmed: seat belts can be unlatched by solenoid release or emergency squibs; the doors can be unlocked, preferably sequentially starting with passenger side, and possibly progressing to the driver's side as well; windows that are partially opened can be rolled all the way down, or those left initially closed, such as the drivers side, are now opened; power doors can be opened, e.g., sliding, casement or pellagram type doors of vans or buses; and ramps or lifts can be signaled to deploy from stowage to transfer or egress level.

Table 1 below is one example of a hierarchy of controller output signals that selectively and progressively initiate activities in the categories described above. Note in the left column, both the temperature and temperature rise rate are considered. The X's indicate one exemplary schedule of action initiation. Table 1 assumes the vehicle is sensed as stopped and the AOS determines no driver is present, but at least one passenger is present.

Note that weighting can be introduced into the decision matrix, e.g. where the AOS determines the high likelihood of a passenger and RFIS are in the same seat, an "infant present" weighting factor can cause actions to start at 90° F., that otherwise would start at from 95 to 105° F.

It should also be understood that preferably the same or similar schedule of actions taken on the basis of $\Delta T$, the temperature rise rate, is taken on absolute temperature thresholds, independent of the temperature rate rise. Thus, where a child is placed in a stopped hot vehicle without the vehicle being operated, as where the child is loaded first in the vehicle and it is some minutes before the vehicle is started, the opening of the door can activate the safety system of the invention. This response can also provide a measure of protection in cases where a child manages to get into a hot vehicle, say during play, and locks him/herself in. Likewise, in the event of wiping-out of the temperature history (temperature rise rate data), this absolute temperature threshold activation would provide the safety features of the invention. For example, a watchdog timer circuit resets the unit, at which the point the temperature may no longer be changing, but the vehicle has a dangerously hot interior, i.e., temperature rise=0, but absolute temperature is above threshold and dangerous, in which case the inventive safety system triggers as a function of absolute temperature. This is illustrated by way of example in more detail FIG. 2 below.

FIG. 2 is a flowchart illustrating method aspects of the invention, including operating programs therefor, and more particularly the present best mode embodiment of operation of system 10, including: monitoring and determination of occupancy state; vehicle motion; interior passenger and/or load space temperature; and warning, relief and "trapped" passenger release logic points of the control program. From an initial "off" condition 132, the controller and its operations program is initiated 80, e.g., at ignition "On" by driver action (on switch); or automatically. The automatic start of the program can be, for instance, as the result of preselected engine operating conditions being satisfied upon which engine microprocessor (not shown) outputs a signal to the controller 12 (FIG. 1). The program initiates a check of the temperature of the interior passenger/load space(s) 84. It should be understood that the same or similar control program logic diagram of FIG. 2 may be run for each space, or the spaces maybe polled sequentially with each polling sequence being followed by the method steps of FIG. 2 relating to that space.

The operation continues with sensed temperature input and determination whether or not the temperature in the designated space is above a predetermined value, by way of example only, such as 90° F. If not, the program recycles 86 to the next temperature check at a preset time later, say a few seconds to a few minutes later.

If the temperature is above 90° F., the system looks for vehicle moving signal 88 and if none, checks occupancy state 90. If the AOS algorithm returns a negative state signal the inventive system can switch to a sleep mode 92. The sleep mode may be a "slow ping" mode, by which is meant relatively long pauses between temperature and occupancy presence monitoring. It should be understood that in case of the passenger compartment, the occupancy state can be seating-space or defined zone-dedicated operation, so that occupancy Y/N determination can be made on a seat-by-seat and/or zone-by-zone basis. If any one seat or zone returns a "yes", the operating program proceeds to the next stage.

The operation algorithm can optionally proceed from a positive (Yes) on motion determination, directly to an "Interior Warning I", 94. The optional nature is shown by the dashed "Yes" line between 88 and 94. Preferably there is an intermediate verification whether there is a driver present 96, if so, the Interior Warning I is triggered. The Interior Warning I may be one or more warnings or annunciations selected from a flashing dashboard light, synthesized or recorded voice announcement, or the like, drawing the driver's attention to the need to take temperature adjustment action(s). Response is monitored 98, and if none, the program logic loops back 100 to Warning I, until an appropriate response is taken by the driver. The response can be for the driver to manually open the windows, turn on the fan, turn on air conditioning units, find shade for the vehicle, or apply a covering. Each switch of the interior (window, fan and AC) units can be monitored to determine activation, and, in the case of the window and fan, the degree of activation, i.e., the amount the window is down or the fan speed level. If there is a positive response, the logic recycles 102, 104, 86 to the temperature check cycling.

In the event driver 96 is not present, which is the normal condition where the vehicle motion 88 is sensed negative (vehicle stopped), the operating cycle proceeds to Interior Warning II, 106. These warnings may be one or more of Warning set I, but directed to the passenger(s) and may be a higher-level warning. For example, the Warning set II may comprise a different synthesized voice announcement, or an insistent buzzer associated with a back-lit instruction panel, which could read for example: "Push Button To Reduce Interior Temperature". This "emergency" button can be a separate activator for window lowering or fan operation, by way of example, and can be associated with each passenger seat, which results in partial lowering of the window adjacent that passenger seat. Each successive push of the flashing, back-lit button can increment the window to open wider, until fully opened, upon which it can start the fan, or initiate external warnings.

The system monitors response(s) 108, for example as before, the window or fan setting, and if the response is positive, recycles/resets 110, 112 to occupancy status check 90, and/or to temperature check 82. If occupancy now checks negative, meaning the occupant has left or been moved, the system can go into sleep mode, as before.

If the response 108 is negative or unsatisfactory, the recent temperature is monitored 116, and the occupancy state monitoring rate is increased 118. A database 120 can be consulted, or a database built through controller monitoring and input of data vs. time over an ensuing, predetermined time period. The controller algorithm preferably includes a weighting function, which includes, for example, such factors as number of occupants, interior temperature, response to Warnings I and II history, and the like. The weighting function is embedded in an active criteria matrix as part of the controller algorithm 122. If the cooling meets a preset criteria, there is a loop back and recycle 124 to the increased temperature and occupancy state monitoring 116, 118,120.

In the event cooling criteria are not met, as by monitoring interior temperature over time and considering number of sensed occupants and responses or not to prior warnings, the system activates exterior warnings, relief and release in a predetermined progressive schedule 126, such as Table 1, above.

The response to the exterior warnings is monitored 128, and iteratively if none, the schedule is incremented from warnings 23 to relief 28 to release 30, as described above for FIG. 1 and Table 1. If there is some response, the system can loop to continuing to monitor 116, or it can be reset 130, e.g., by the driver or rescue personnel resetting the system in response to a backlit "Reset" dashboard or control panel button by pushing that reset button. Upon reset, the system can cycle, selectively, to off 132 or sleep 92.

It will be appreciated that the various interior warning, exterior warnings, relief and release levels, types and progressive stages can be chosen and activation signals provided for by the controller.

Industrial Applicability:

The hot vehicle entrapment safety system of the invention is widely applicable to automotive vehicles, primarily passenger cars, vans, transit buses and the like. The inventive system has as a priority the saving of children, elderly and infirm people and pets from hyperthermia leading to death in closed vehicles. The advantages of the system is that it uses currently available technology, such as automotive occupancy sensor systems employing ultrasound, proximity switches, capacitance sensors, door open/close sensors, window open/close sensors, power-on (ignition-on) sensors, temperature sensors, and the like which are electrically interlinked to already existing automotive systems, such as power door locks, power window motors, vehicle horns, lights, GPS, etc. The interlinks are electronically and electrically straightforward, and the system control algorithm realization is clearly well within the capability of programmers skilled in the art. The system is entirely feasible, permitting relatively rapid commercialization. For an AOS system, it offers an additional utility above and beyond its current airbag deployment control system occupancy state input.

It should be understood that various modifications within the scope of this invention can be made by one of ordinary skill in the art without departing from the spirit thereof. For example, the inventive system, in conjunction with an AOS, can provide a preventive warning by announcing to the driver, upon stopping and opening the door, a reminder that "Passenger Present" or "Do Not Leave Passenger Unattended", where the AOS determines a passenger is and remains present upon the driver's seat becoming empty.

The alert/warning aspect of the invention in is simplest industrially applicable form may comprise a dash switch that is initialized (pushed or tripped) by a driver or able passenger upon entering the vehicle or loading a non-abled passenger or pet. In one embodiment, this switch may be a push button next to or comprising an illuminable (back lit) occupancy state indicator having a suitable legend, such as: "Child Present," "Passenger Vulnerable to Heat," or a suitable heat warning icon. The switch initializes a reminder alert or warning such that whenever the driver or passenger door is opened, the signage lighting turns on, or turns on and flashes, or a voice announcement is made, or a warning buzzer or light comes on. An examples is a recorded or synthesized voice announcement "Warning, Do Not Leave Child in Vehicle." This operator/passenger initiated alert/warning reminder system may be used alone or in conjunction with the vehicle stop sensing, exterior or interior temperature monitoring, seatbelt latch switches, occupancy state monitoring, and with or without the progressive exterior warnings 26, relief 30 and or releases 32 of FIGS. 1 and 2, yet does not absolutely require the AOS sensors or the algorithm.

The exterior and interior temperature monitoring can be set for cold temperature extremes in order to protect non-abled persons and animals from freezing. That is, the inventive system is equally applicable to any extreme temperature condition to which passengers could be subjected and which cause a danger.

In another example, the inventive system can be employed for passenger release from submerged or wrecked cars by use of appropriate interior flooding or vehicle upside-down sensors, as the case may be. Or, in an alternative, crush sensors or the crash accelerometer in the airbag controller can be wired into the inventive AOS/safety controller 12 to signal an upright wreck, one resulting action being that the system will initiate a "call" (phone or RF broadcast) of a message to rescue/emergency personnel.

Currently available automotive microprocessors, of the type and capability used in Automotive Occupancy. Systems, Airbag Control. Systems, Engine Control. Systems, Display Systems (dashboard display),. Systems Monitoring and Control; communications systems; climate control systems and the like are suitable for the monitoring, evaluation and decision algorithms functions of the controller of the inventive safety system. A microprocessor or computer used in the inventive system typically includes at least one processor and memory coupled to a bus. The bus may be any one or more of any suitable bus structures, including a memory bus or memory controller, peripheral (sensor input and actuator output) bus, and a processor or local bus using any of a variety of bus architectures and protocols. The memory typically includes volatile memory (e.g., RAM) and fixed and/or removable non-volatile memory (e.g., ROM, Flash, hard disk, mini-drive, magneto-optical, and the like), to provide for storage of information, including computer-readable instructions, data structures (including temperature and other sensed condition and occupancy histories), program modules, operating systems, and other data and algorithms used by the microprocessor(s) of the inventive system.

Accordingly, this invention is to be defined by the scope of the appended claims as broadly as the prior art will permit, and in view of the specification if need be, including equivalents thereof.

What is claimed is:

1. Method for reducing danger to vehicular passenger and animal occupants of heat prostration or suffocation upon being trapped in a hot, closed vehicle comprising the steps of:

providing a passenger safety system comprising a vehicle interior space occupancy sensor assembly that includes an ultrasound unit and a controller including a safety algorithm for activating passenger/animal occupant alert, an exterior alert, passenger/animal occupant relief and passenger/animal occupant release functions;

b) monitoring with said safety system a vehicle operational state including sensing when said vehicle is in a stopped condition;

c) implementing said safety algorithm when a stopped condition of said vehicle is sensed, including;
  i) determining with said occupancy sensor an occupancy state of said vehicle interior space selected from a passenger compartment and a load space;
  ii) upon determining said vehicle interior space includes at least one occupant, monitoring and evaluating interior temperature rise data extracted from an output of said ultrasound unit; and
  iii) progressively triggering at least two of an interior alert, an exterior alert, a heat relief measure; and a passenger/animal occupant release measure in response to criteria including said vehicle is in a stopped condition, said vehicle interior space occupancy state is determined to be occupied, and the monitored temperature satisfies a predetermined danger criteria.

2. Method as in claim 1 wherein said step of sensing a vehicle stopped condition is selected from vehicle ignition state, vehicle electrical system activity, vehicle accelerometer activity or history, odometer activity, amount of road vibration, GPS location updates, engine activity, external motion sensing, trunk or door open/closed, parking brake on, and occupancy state history; and wherein said triggering includes evaluating said sensed vehicle condition.

3. Method as in claim 1 wherein said occupancy state determining step includes the step of evaluating the output of at least one additional sensor selected from an ultrasound sensor, an IR sensor, an imaging sensor, a microphone, a seat sensor, a capacitance sensor, a motion sensor, and a floor sensor, or the occupancy history.

4. Method as in claim 1 wherein:
a) said step of triggering said interior alert includes activating at least one of a voice announcement, a warning sound, and an illuminated warning;
b) said step of triggering said exterior alert includes activating at least one of vehicle lights, sounding a vehicle horn, sounding an alarm system siren, and an outbound RF message;
c) said step of triggering said passenger/animal relief includes activating at least one of opening at least one window or roof panel, turning on a fan, turning on a vehicle AC system, deploying shading, increasing reflectivity, and providing location information to rescuers; and
d) said step of triggering said passenger/animal release includes activating at least one of a seat belt release, unlocking a door, opening a window or roof panel and deploying a ramp or lift.

5. Method as in claim 1 wherein said predetermined temperature criteria include at least one of absolute temperature value and rate of temperature rise over time.

6. Method as in claim 5 wherein the frequency of extraction of temperature data from said ultrasound unit output increases when the absolute temperature of said vehicle interior space reaches a preselected value.

7. Method as in claim 5 wherein at least one of said triggerings occurs when a passenger compartment door, trunk lid or load compartment access door is detected as sequencing open/close, said ultrasound unit is awakened to monitor at least one of interior and exterior temperature for said triggering determination, in part to protect against "crawl-in" type entrapment of children.

8. Method for providing an alert to assist in avoiding development of a heat condition in the interior of a vehicle that is dangerous to non-abled human and animal occupants, comprising the steps of:
a) providing a reminder device for the vehicle driver and able passengers of the presence of non-abled vehicle occupants,
b) arming said reminder device upon inclusion of at least one non-abled occupant in said vehicle;
c) sensing a condition of at least one of said driver or an able passenger leaving said vehicle, vehicle ignition OFF after a period of ignition ON, vehicle stopped, and at least one of the driver and an able passenger door opening or/and closing;
d) monitoring the temperature in the vehicle space in which said non-abled vehicle occupant is located by extraction of temperature data from the output of at least one ultrasound transducer; and
e) triggering said reminder upon both said monitored temperature satisfying a predetermined criteria and at least one of said sensed conditions occurring so that said reminder device provides an alert to at least one of said driver and said able passenger to not leave said non-abled occupant untended in the vehicle to suffer from heat-induced injury.

9. Method as in claim 8 wherein said alert is selected from at least one of a light, a lighted message, a sound alarm and a voice announcement.

10. Method as in claim 8 which includes the added step of triggering at least one of an exterior alert, a heat relief measure and a release measure in response to at least one of said sensed conditions occurring.

11. Method as in claim 10 wherein:
a) said step of triggering said exterior warning includes activating at least one of vehicle lights, sounding a vehicle horn, sounding an alarm system siren, and an outbound RF message;
b) said step of triggering said passenger/animal relief includes activating at least one of opening at least one window or roof panel, turning on a fan, turning on a vehicle AC system, deploying shading, increasing reflectivity, and providing location information to rescuers; and
c) said step of triggering said passenger/animal release includes activating at least one of a seat belt release, unlocking a door or trunk, unlocking or opening a window or roof panel and deploying a ramp or lift.

12. Method as in claim 8 wherein said predetermined temperature criteria include at least one of absolute temperature value and rate of temperature rise over time.

13. Method as in claim 12 wherein the frequency of extraction of temperature data from said ultrasound unit output increases when the absolute temperature of said vehicle interior space reaches a preselected value.

14. Apparatus system for reminding or warning against development of excess heat conditions in vehicle passenger and/or load spaces, comprising in operative combination:
a) a safety system which includes at least one temperature sensor for monitoring the ambient temperature of at least one of a vehicle interior space and the exterior, comprising at least one ultrasound transponder unit;
b) said safety system includes a controller having a signal processing algorithm for determining when said vehicle is in a stopped condition and for extraction of temperature data from an input from said ultrasound transponder unit, a state and temperature history database, and a control algorithm including a set of temperature criteria for at least one of reminder and warning activation triggers; and c) at least one warning device mounted in association with said vehicle triggered by said controller in response to a determination that said vehicle is in the stopped condition and the monitored temperature satisfying a predetermined criteria, for at least one of:
  i) reminding against leaving a non-abled passenger or animal in the vehicle; and
  ii) warning of at least one sensed temperature condition exterior or interior of said
vehicle that tends toward danger for a ion-abled passenger or animal in said vehicle space.

15. System as in claim 14 wherein said warning device comprises an initializable sound or visual reminder unit electrically linked to at best one vehicle door open/close sensor, so that after initializing, upon said vehicle door being sensed as opened or/and closed, said reminder unit warning is activated.

16. System as in claim 14 wherein said system includes at least one vehicle stopped condition sensor that provides an output to said controller of at least one of vehicle ignition state, vehicle accelerometer activity or history, vehicle electrical system activity, odometer activity, amount of road vibration, GPS location updates, engine activity, external motion sensing, trunk or door open/close, parking brake on, and occupancy state.

17. System as in claim 16 wherein said controller progressively triggers at least two of an interior vehicle warning, an exterior warning, a passenger/animal occupant relief measure and a passenger/animal occupant release measure.

18. System as in claim 17 wherein;
a) said interior warning is selected from a voice announcement, a warning sound, and an illuminated warning;
b) said exterior warning is selected from flashing vehicle lights, sounding a horn, sounding an alarm system siren, and an RF call out;
c) said passenger/animal relief is selected from opening at least one window or roof panel, turning on a fan, turning on a vehicle AC system, deploying shading, darkening or increasing reflectivity of windows, and providing location information to rescuers; and
d) said passenger/animal release is selected from disconnecting a seatbelt, unlocking a door, opening a window or roof panel, opening a door, and deploying a ramp or lift.

19. System as in claim 16 wherein said vehicle condition occupancy state sensor comprises at least one of an ultrasound sensor, an IR sensor, an imaging sensor, a microphone, a seat sensor, a floor sensor, a capacitance sensor, and a motion sensor.

20. System as in claim 19 wherein said occupancy state sensor comprises a linear array of transducers, and the input to the controller therefrom is selectively evaluated for at least one of a Head Zone, a seat zone, a floor zone and side scan for window position.

21. System an in claim 19 wherein said occupancy state sensor comprises a linear array of transducers, and the input to the controller therefrom is selectively evaluated for at least one of a Head Zone, a seat zone, a floor zone and side scan for window position.

22. A computer readable media storing computer executable instructions that, when executed by at least one processor, performs the method of claim 1.

23. In a method of reducing the danger to vehicular passengers and animals of heat prostration or suffocation upon being trapped in a hot, closed vehicle, in which interior temperature of an occupied vehicle is sensed, and in response to said temperature an excessive temperature warning signal is generated, the improvement comprising the steps of sensing a stopped condition of said vehicle, and triggering an occupant release measure in response to both said stopped condition and a temperature signal sensed by an ultrasound sensor to be in excess of a pre-determined temperature criteria.

24. Improved method as in claim 23 wherein the step of sensing a vehicle stopped condition is selected from sensing vehicle ignition state, vehicle accelerometer activity or history, vehicle electrical system activity, odometer activity, amount of road vibration, GPS location updates, engine activity, external motion, trunk or door open/closed, parking brake on, and occupancy state history, and wherein said passenger release triggering step includes evaluating said sensed vehicle condition.

25. Improved method as in claim 24 wherein said temperature sensed is the temperature of at least one vehicle interior space selected from a passenger compartment and a load space.

26. Improved method as in claim 25 wherein said occupancy state sensing steps includes the step of evaluating the output of at least one sensor selected from an ultrasound sensor, an IR a easer, an imaging sensor, a microphone; a seat sensor, a capacitance sensor, a motion sensor, and a floor sensor.

27. Improved method as in claim 23 which includes the steps of progressively trigging at least one of an interior warning, an exterior waning, and a passenger/animal relief measure, followed by triggering said passenger/animal release.

28. Improved method as in claim 27 wherein;
a) said step of triggering said interior warning includes activating at least one of a voice announcement, a warning sound, and an illuminated warning;
b) said step of triggering said exterior warning includes activating at least one of vehicle lights, sounding a vehicle horn, sounding an alarm system siren, and an outbound RF message;
c) said step of triggering said passenger/animal relief includes activating at least one of opening at least one window or roof panel, turning on a fan, turning on a vehicle AC system, deploying shading, in creasing reflectivity, and providing location information to rescuers; and
d) said step of triggering said passenger/animal release includes activating at least one of a seat belt release, unlocking a door or trunk, unlocking or opening a window or roof panel and deploying a ramp or lift.

29. Improved method as in claim 23 wherein said predetermined temperature criteria include at least one of absolute temperature value and rate of temperature rise over time.

30. Improved method as in claim 29 wherein the frequency of extraction of temperature data from said ultrasound unit output increases when the absolute temperature of said vehicle interior space reaches a preselected value.

31. Improved method as in claim 29 wherein at least one of said triggerings occurs when the vehicle is detected as not running and a door, trunk lid or load compartment access door is detected as sequencing open/close, said ultrasound unit is awakened to monitor at least one of interior and exterior temperature for said triggering determination, in part to protect against "crawl-in" type entrapment of children.

32. Apparatus system for reducing the danger to vehicular passengers and animals of heat prostration or suffocation upon being trapped in a hot, closed vehicle comprising in operative combination:
   a) at least one temperature sensor for monitoring at least one of a vehicle interior space and the exterior ambient temperature wherein said interior space temperature is extracted from a return signal output from an ultrasound sensor;
   b) at least one vehicle stopped condition sensor;
   c) a controller receiving an output of said vehicle operational state sensor and said temperature sensor, a vehicle stopped condition and occupancy state and temperature history database, and a control algorithm including a set of temperature criteria for triggering at least one passenger/animal release measure in response to said vehicle being in a stopped condition and a predetermined temperature being sensed; and
   d) at least one passenger/animal release activator connected to said controller for releasing at least one of a passenger/animal restraint or unlocking or opening an exit or escape passage.

33. Apparatus system as in claim 32 wherein said release activator includes at least one of a seat belt release, a door or trunk lock, a window or roof panel opener and a ramp or lift deploy unit.

34. Apparatus system as in claim 32 wherein said vehicle stopped condition sensor provides an output to said controller of at least one of vehicle ignition state, vehicle electrical system activity, odometer activity, amount of road vibration, GPS location updates, engine activity, external motion sensing, trunk or door open/close, parking brake on, and occupancy state.

35. Apparatus system as in claim 34 wherein:
   a) said controller algorithm progressively triggers at least one of an interior vehicle warning, an exterior warning, a passenger/animal relief measure, followed by said passenger/animal release activator;
   b) wherein said interior warning is selected from actuators for a voice announcement, a warning sound, and an illuminated warning;
   c) said exterior warning is selected from actuators for flashing vehicle lights, sounding a horn, sounding an alarm system siren, and an RF call out; and
   d) said passenger/animal relief is selected from actuators for opening at least one window or roof panel, turning on a fan, turning on a vehicle AC system, deploying shading, darkening or increasing reflectivity of windows, and providing location information to rescuers.

36. Apparatus system as in claim 34 wherein said occupancy state sensor comprises at least one of an ultrasound sensor, an IR sensor, an imaging sensor, a microphone, a seat sensor, a floor sensor, a capacitance sensor, and a motion sensor.

* * * * *